(12) United States Patent
Giroudiere et al.

(10) Patent No.: US 7,947,117 B2
(45) Date of Patent: May 24, 2011

(54) HYDROGEN PURIFICATION PROCESS THAT USES A COMBINATION OF MEMBRANE SEPARATION UNITS

(75) Inventors: Fabrice Giroudiere, Orlienas (FR); Elsa Jolimaitre, Lyons (FR); Nicolas Boudet, Chaponost (FR); Helene Rodeschini, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 328 days.

(21) Appl. No.: 12/176,046

(22) Filed: Jul. 18, 2008

(65) Prior Publication Data
US 2009/0044701 A1 Feb. 19, 2009

(30) Foreign Application Priority Data
Jul. 20, 2007 (FR) ...................... 07 05317

(51) Int. Cl.
*B01D 53/22* (2006.01)
(52) U.S. Cl. ............ 95/55; 96/4; 96/7; 96/9; 423/437.2; 423/651; 423/655
(58) Field of Classification Search ............... 95/45, 55, 95/56; 96/4, 7, 9; 423/437.2, 651, 655
See application file for complete search history.

(56) References Cited

U.S. PATENT DOCUMENTS

| 4,264,338 A * | 4/1981 | Null .................................. 95/55 |
| 5,314,528 A * | 5/1994 | Monereau .......................... 95/55 |
| 5,378,263 A * | 1/1995 | Prasad ................................ 96/9 |
| 5,873,928 A | 2/1999 | Callahan |
| 6,168,649 B1 * | 1/2001 | Jensvold et al. .................. 95/47 |
| 6,179,900 B1 | 1/2001 | Behling et al. |
| 6,293,996 B1 * | 9/2001 | Grantham et al. .................. 96/7 |
| 6,387,157 B1 * | 5/2002 | Yamashita ........................ 95/55 |
| 6,613,125 B1 * | 9/2003 | Wallace et al. ................... 95/55 |
| 6,648,944 B1 * | 11/2003 | Baker et al. ........................ 96/9 |
| 6,986,802 B2 * | 1/2006 | Colling et al. ..................... 96/9 |
| 7,604,681 B2 * | 10/2009 | Malsam et al. ..................... 96/7 |
| 2003/0223931 A1 | 12/2003 | Narayan |
| 2004/0230085 A1 * | 11/2004 | Jakkula et al. ................ 585/240 |
| 2005/0244329 A1 * | 11/2005 | Casanave et al. ............. 423/651 |

FOREIGN PATENT DOCUMENTS

FR 2867464 A1 3/2004

OTHER PUBLICATIONS

Chiappetta et al., "Design of an Integrated Membrane System for a High Level Hydrogen Purification", Chemical Engineering Journal, Nov. 2006, vol. 124, pp. 29-40.*
Chiappetta, G. et al. "Design of an Integrated Membrane System for a High Level Hydrogen Purification." Chemical Engineering Journal 124 (2006): 29-40.
Han, Jaesung et al. "Metal Membrane-type 25-kW Methanol Fuel Processor for Fuel-cell Hybrid Vehicle." Journal of Power Sources 112 (2002): 484-490.

* cited by examiner

*Primary Examiner* — Jason M Greene
(74) *Attorney, Agent, or Firm* — Millen, White, Zelano & Branigan, P.C.

(57) ABSTRACT

This invention describes a new hydrogen purification process that employs a combination of at least three membrane separation units. This process allows non-stationary operations and is particularly suitable for the production of hydrogen for the purpose of its use in a fuel cell.

15 Claims, 1 Drawing Sheet

HYDROGEN PURIFICATION PROCESS THAT USES A COMBINATION OF MEMBRANE SEPARATION UNITS

FIELD OF THE INVENTION

This invention relates to the field of the production of hydrogen with a high level of purity, more particularly for its use in a fuel cell. Other applications of high-purity hydrogen produced by this process are also possible within the field of electronics, the field of farm produce for the processing of certain agricultural oils, and in space propulsion.

The hydrogen that is used in a fuel cell should meet certain specifications and in particular a limit on the carbon monoxide content that should be less than 150 ppm, and preferably less than 100 ppm, for the most recent generations of cells.

Another characteristic of the process according to this invention is its flexibility in terms of its ability to meet intermittent operating cycles and non-stationary operations.

In a general way, the purification process that is described in this application is placed downstream from a process of steam reforming a petroleum fraction or natural gas that generates a gas that consists essentially of carbon monoxide, hydrogen ($H_2$) and carbon dioxide ($CO_2$).

This gas, commonly called synthesis gas, contains on the order of 10% by volume of CO and requires a subsequent stage for converting CO into $CO_2$ (denoted WGS in abbreviated form due to its English name "water gas shift").

This reaction for conversion of the CO is promoted at low temperature and often takes place in two stages called "high temperature" for the first and "low temperature" for the second. At the end of the second stage, the CO content in the gaseous effluent is about 0.5% by volume.

To reduce the CO content to values on the order of 100 ppm, it is therefore necessary to carry out a final purification that is generally achieved either in a catalytic process of the preferred oxidation type (PROX) or in an adsorption process, generally a PSA-type process, or finally in a membrane separation process.

This invention relates to a membrane separation process, whereby the membrane that is used is of the polymer type, and the process is located
   Either downstream from the two stages for conversion of the carbon monoxide,
   Or downstream from a single high-temperature conversion stage, because the process makes it possible to eliminate the low-temperature WGS stage.

The process according to the invention is therefore applied downstream from any
process for the production of synthesis gas, whether the latter is obtained by steam reforming of a petroleum fraction or by partial oxidation, or by any combination of these two processes (called an autothermal process).

Of course, the process according to this invention is compatible with any feedstock that is used in the process for the production of synthesis gas that is located upstream.

One of the advantages of this invention resides in the flexibility of the CO content that can be adapted to requirements of different types of fuel cells. In particular, this invention makes it possible to reach a CO content that is less than 100 ppm, and even less than 50 ppm.

EXAMINATION OF PRIOR ART

Prior art in the field of the hydrogen purification by membranes is adequately developed, but very few of these processes use polymer-type membranes.

U.S. Pat. No. 6,350,297 B1 describes a hydrogen purification process that is obtained from a reforming gas mixture, using an $H_2$ diffusion membrane as well as a methanation catalyst combined with this membrane, for a fuel cell application. The type of membrane that is used in this patent, so-called $H_2$-permeable synthetic membranes, has been developed for the separation and the purification of hydrogen. Specifically the purification technique is based here on the selective diffusion of $H_2$ through a hollow fiber bundle comprising a Pd/Ag alloy, but this technique presents a certain number of drawbacks:

The working pressure should be high, and the transfer rates through the membrane are generally quite low. It has been possible to provide improvements by depositing a Pd/Ag alloy on a ceramic substrate. This metal alloy can then be finer, creating a reduction of costs and an increase in the transfer through the membrane at a given pressure.

The hydrogen diffusion membrane that is described in the cited patent consists of a Pd/Ag film with a thickness of 7.5 microns that is deposited on an alumina tube.

The process according to this invention does not rely on hydrogen diffusion membranes but on polymer membranes that are less costly and easy to use.

In addition, in the cited patent, a methanation catalyst is associated with the membrane for eliminating the carbon oxides. The process according to this invention does not require a methanation stage. That is not to state that a methanation stage cannot be used, but for the application herein described at the present time, a methanation stage would be a needless expense.

Patent WO 1999046032 describes a method and a device designed for the purification of hydrogen obtained from a reformer or an oxidation burner. The membranes that are used in this patent are:
   Hydrogen diffusion membranes, such as palladium, which works at generally elevated temperatures so as to maximize the transfer rate.
   Ceramic membranes (zirconia or stabilized zirconia).
   Anion-conductive membranes, such as for example, the oxygen ion, which can be made of zirconia.
   Membranes that conduct both oxygen ions and electrons.
   Oxygen-conductive ceramic membranes.

The present invention is distinguished from the patent that is cited in that the membranes
that are used in the process that is the object of the invention are polymer-type membranes, and in that the operating temperature is in particular lower than that described in the cited patent (650-1000° C.).

Patent EP1207132 A1 describes a process for the production of hydrogen from the gasification of various fuels, which comprises in particular:
   A fuel cell, with an ion-exchange membrane
   A shift stage for converting CO
   A methanation stage
   A membrane separation stage without the nature of the membrane being specified.

Again, the process according to the present invention does not require a methanation stage.

Patent WO 2004031073 describes a process for reforming and purifying hydrogen, comprising a hydrogen-selective membrane and designed to feed a fuel cell. The membrane can be used to process the entire flow or else only a portion of the latter. The membrane can be an inorganic molecular sieve, a pure metal, a metal alloy, or else a molecular sieve that is combined with an alloy of metals or a pure metal. The thickness of the module (membrane+support) is between 0.1 and 100 microns. The retentate that does not pass through the membrane is sent to the burner to produce the heat that is necessary for the production of hydrogen. The process that is described in this document does not use polymeric membranes.

Document U.S. Pat. No. 6,579,331 B1 describes a process that makes it possible to withdraw the $CO_2$, contained in a synthesis gas, selectively, which makes possible an enrichment of $H_2$. The described process is presented as more advantageous than an $H_2$-selective membrane in terms of necessary pressure. The $CO_2$-selective membrane consists of a hydrophilic polymer (=polyvinyl alcohol, polyvinyl pyrrolidone, polyethylene oxide, polypropylene oxide, polyacrylamide, polyvinyl acetate, and mixtures and copolymers) and at least one halogen salt that has the formula $R4N^+X^-$ (and also a binding agent). Accordingly, this membrane is a $CO_2$-selective membrane and not an $H_2$-selective membrane. In addition, the flowsheet integrates a methanizer, which is not the case of the process according to this invention.

SUMMARY DESCRIPTION OF THE INVENTION

Figure 1:
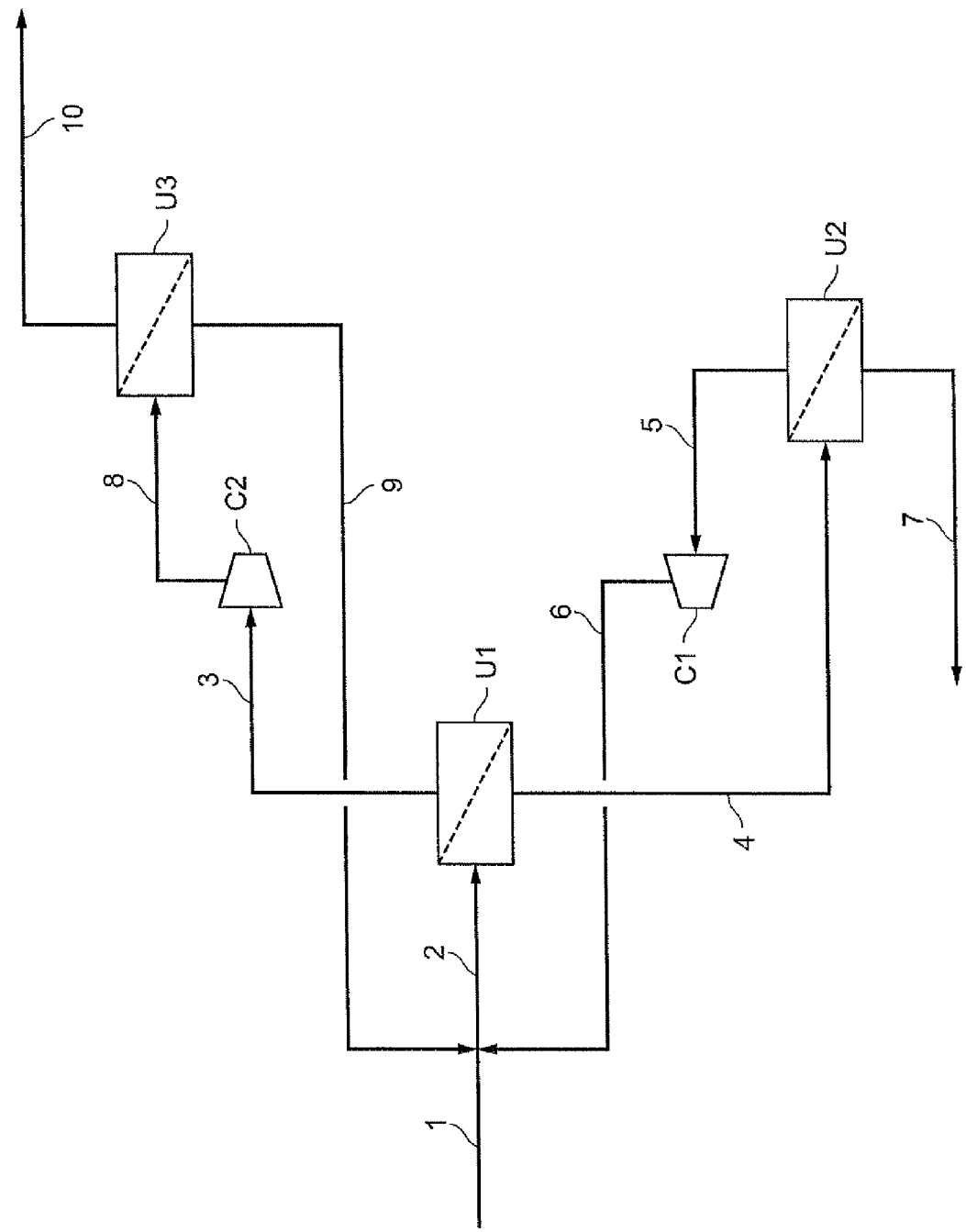
FIG. 1 shows a flowsheet of the process according to the invention in which three membrane separation units are used, whereby the process is placed downstream from a high-temperature WGS unit. The process according to the invention makes it possible to eliminate the low-temperature WGS unit.

The process according to this invention can be defined as a hydrogen purification process contained in a synthesis gas after passage into a high-temperature WGS unit, whereby said synthesis gas contains less than 5,000 ppm of CO.

The process according to the invention relies on at least three membrane separation units.

The pressure difference between the upstream and the downstream of each membrane separation unit is generally between 5 and 50 bar, and preferably between 10 and 30 bar (1 bar=$10^5$ pascal).

The membrane of each of the separation units is a polymer membrane, preferably of polyimide type, having a permeability of more than 50 Barrer, and an $H_2$ selectivity relative to the CO of more than 30. The Barrer is a unit that is specific to permeation that is expressed in Si unit per 1 Barrer=$7.5 \cdot 10^{-18}$ $m^2/Pa \cdot s$. The operating temperature of each separation unit is generally between 20° C. and 250° C.

The process according to this invention generally makes it possible to reach a recovery level of hydrogen that is more than 85% by mass with a CO content in the hydrogen that is obtained that is generally less than 150 ppm, and preferably less than 100 ppm.

When the synthesis gas that contains the hydrogen to be purified is obtained from a steam-reforming unit that comprises a steam-reforming furnace, the second retentate (7) that is obtained from the process according to the invention can be used as a fuel in said steam-reforming furnace.

The hydrogen purification process according to this invention is generally placed downstream from the high-temperature CO conversion unit.

The hydrogen purification process according to this invention relies on three membrane separation units (denoted U1, U2, and U3 in FIG. 1) and consists hereinafter of the following stages:

The mixture to be processed (1) is introduced into a first membrane separation unit (U1), from which there is extracted:

A first permeate (3) that consists essentially of hydrogen that is sent into a third membrane separation unit (U3), after recompression, A first retentate (4) that is introduced into a second membrane separation unit (U2), from which there is extracted:

A second permeate (5), which, after recompression, is recycled (flow 6) to the inlet of the first separation unit (U1) in a mixture with the flow to be processed (1), and A second retentate (7);

from the third membrane separation unit, there is extracted:

A third retentate (9) that is recycled to the inlet of the first membrane separation unit (U1), A third permeate (10) that consists of hydrogen with at least 99% purity and that contains at most 150 ppm of CO.

When the synthesis gas that contains the hydrogen to be purified is obtained from a steam-reforming unit that comprises a steam-reforming furnace, the second retentate (7) can be used as a fuel in said steam-reforming furnace.

This invention can be applied to a process for producing electricity by means of a fuel cell, whereby the hydrogen that feeds said fuel cell is produced by the process according to the invention.

This invention can also be applied to a process for processing oils in the farm produce industry that is based on the hydrogen that is produced by the process according to the invention.

Furthermore, the invention can be applied to any gas containing hydrogen not just from a high temperature WGS unit.

DETAILED DESCRIPTION OF THE INVENTION

In this part, we are providing a description of the process according to FIG. 1, corresponding to the basic case relying on three membrane separation units. This process makes it possible to obtain the purified hydrogen with at least 99% purity with a recovery level that can reach 86%.

The flow (1) is obtained from a high-temperature WGS unit after a separation from the water that is carried out at low temperature (about 40° C.) in a separator tank (not shown in FIG. 1).

The typical composition of this flow (1) is provided below in % by volume:

$H_2$: 74.9
CO: 4.5
$H_2O$: 0.3
$CO_2$: 15.7
$CH_4$: 4.5

This flow is available at a temperature of between 40° C. and 60° C. and at a pressure of between 15 and 30 bar. It is mixed with the recycling flow (6) that is obtained from the permeate of the second membrane separation unit (U2) and with the recycling flow (9) that is obtained from the retentate of the third membrane separation unit (U3) to constitute the flow (2) that feeds the first membrane (U1). The typical composition of the flow (2) is provided in the table below:

$H_2$: 76.65
CO: 4.2
$H_2O$: 0.25
$CO_2$: 14.7
$CH_4$: 4.2

The operating conditions of the separation unit (U1) are the following:

Pressure difference between the supply and the permeate (denoted Delta P supply/permeate): between 10 and 20 bar
Temperature between 20° C. and 250° C.

The flow (3) that constitutes the permeate of the separation unit (U1) essentially consists of hydrogen at a purity of more than 98%. Its carbon monoxide content is less than 150 ppm, and preferably less than 100 ppm. This flow (3) can feed a fuel cell directly.

The flow (4) that constitutes the retentate of the separation unit (U1) has the following typical composition:
$H_2$: 51.8
CO: 0.6
$H_2O$: 0.0
$CO_2$: 38.8
$CH_4$: 8.8

This flow (4) is directed toward the second membrane separation unit (U2), which works with the same conditions as the unit (U1).

The flow (5) that constitutes the permeate of the separation unit (U2) is recycled after compression in the compressor (C1). The compressed flow (6) is recycled to the inlet of the first separation unit (U1) in a mixture with the flow (1).

The flow (7) that constitutes the retentate of the second membrane separation unit (U2) has the following typical composition:
$H_2$: 31.0
CO: 0.8
$H_2O$: 0.0
$CO_2$: 55.5
$CH_4$: 12.7

This flow (7) can be used as a fuel in the steam-reforming unit that is placed upstream. This invention is not tied to any particular use of this flow that can, for example, be directed toward another hydrogen separation unit or else can be used as a fuel in a boiler or a furnace.

The flow (9), retentate of the separation unit (U3), is recycled to the inlet of the separation unit (U1) in a mixture with the flow (1) and the flow (6) to form the flow (2).

The permeate flow (10) from the separation unit (U3) consists of hydrogen with 99.5% purity. The overall recovery level of the hydrogen that is defined as the ratio of the $H_2$ flow rate in the flow (10) to the $H_2$ flow rate in the incoming flow (1) is: 87.9%.

The membranes that are used in the process according to this invention are typically "permselective" for hydrogen, which means that they are both permeable and selective for hydrogen.

Said membranes comprise at least one compound of polymeric nature, preferably belonging to the family of polyimides, polyamides, polycarbonates, polysulfones, poly(amide imides), poly(ether sulfones), and polyesters.

The polymer that constitutes the selective layer of the membrane that is being considered can be a homopolymer, a copolymer, or a mixture of polymers.

Homopolymer is strictly defined as a polymer that consists of the same pattern of repetition.

Copolymer is defined as a polymer that consists of at least two different patterns, each of the patterns belonging to the same family or to different families.

The concept of a polymer mixture should be included between the physical mixture of at least two polymers, whereby each polymer of the mixture can be a homopolymer or a copolymer.

The membranes that are used in this process according to this invention are amorphous polymer-type membranes that are vitreous or that have a low crystallinity. The membranes that are used in this invention, apart from the presence of the polymer, can contain mineral and organic feedstocks and additives that are designed to improve the separation factor and/or to promote permeability.

By way of example, it is possible to cite the mineral feedstocks such as the metallic salts, the zeolites, the clays, the mesoporous compounds, the native or post-treated silicas, the carbon blacks, the pyrolyzed polymers, the carbon nanotubes and the dendrimers.

Preferably, when a mineral feedstock is added to the polymer, it will be of the zeolite type.

The membranes that are used in this invention can also contain cross-linking agents that allow an improvement in the factor of separation and/or permeability.

The membranes that are used in this invention can also be treated chemically, thermally, or by radiation, thus making it possible to improve the separation factor and/or to promote the permeability.

The membranes that are used in this invention can be composite or not, deposited on a substrate or not on a substrate, asymmetrical or not. They can come in the form of hollow fibers or in the form of integrated films in a flat module or in a spiral module.

The performance levels of the membranes are usually described by two parameters, the permeability and the selectivity. The permeability is defined as the flow of material passing through the membrane, multiplied by the thickness of said membrane and added to the partial pressure difference of compounds that pass through the membrane that is applied between the upstream and downstream faces of said membrane.

The selectivity of the membrane for the component A relative to the component B is defined as the ratio of the permeabilities of the two components A to B.

The permeability is measured in Barrer (1 Barrer=$7.5 \cdot 10^{-1}$ $m^2/Pa \cdot s$).

Within the scope of this invention, the membranes that are used have a permeability of more than 20 Barrer, and preferably more than 50 Barrer.

The H2 membrane selectivity relative to the CO is generally more than 30, and preferably more than 50.

EXAMPLE

The example that is provided makes it possible to illustrate the hydrogen production with a purity level of more than 99% from a synthesis gas after passage into a high-temperature WGS unit.

The example corresponds to the process according to the invention with three membrane separation units and without a low-temperature CO conversion unit, whereby the process is placed immediately downstream from the high-temperature CO conversion unit (WGS).

The example corresponds to the process of FIG. 1.

Table 1 below sums up the flow rates of each of the flows as well as their composition:

TABLE 1

| Summary of the Flows of the Example | | | | | | | | | | |
|---|---|---|---|---|---|---|---|---|---|---|
| Flow | 1 | 2 | 3 | 4 | 5 | 6 | 7 | 8 | 9 | 10 |
| Temperature (° C.) | 38 | 40 | 40 | 40 | 40 | 60 | 40 | 45 | 45 | 45 |
| Pressure (bar abs.) | 23 | 23 | 5.4 | 23 | 5.4 | 23 | 23 | 23 | 23 | 5 |

TABLE 1-continued

Summary of the Flows of the Example

| Flow | 1 | 2 | 3 | 4 | 5 | 6 | 7 | 8 | 9 | 10 |
|---|---|---|---|---|---|---|---|---|---|---|
| Total Flow Rate (kilo mol/h) | 3.78 | 4.35 | 2.71 | 1.64 | 0.36 | 0.36 | 1.28 | 2.71 | 0.21 | 2.5 |
| Composition (% by Volume) | | | | | | | | | | |
| $H_2$ | 74.86 | 76.75 | 98.22 | 41.23 | 93.07 | 93.07 | 26.65 | 98.22 | 82.60 | 99.49 |
| CO | 4.55 | 4.17 | 0.21 | 10.72 | 1.06 | 1.06 | 13.44 | 0.21 | 2.67 | 0.01 |
| $H_2O$ | 0.29 | 0.25 | 0.40 | 0 | 0 | 0 | 0 | 0.40 | 0 | 0.43 |
| $CO_2$ | 15.75 | 14.66 | 0.96 | 37.32 | 4.80 | 4.80 | 46.47 | 0.96 | 12.04 | 0.06 |
| $CH_4$ | 4.55 | 4.17 | 0.21 | 10.73 | 1.07 | 1.07 | 13.45 | 0.21 | 2.69 | 0.01 |

The separation unit (U1) consists of a membrane with a surface area of 20.1 m2, which allows it to operate with a hydrogen recovery level of 79.7%.

The separation unit (U2) consists of a membrane with a surface area of 7.7 m2, and it operates with a hydrogen recovery level of 49.6%

The separation unit (U3) consists of a membrane with a surface area of 10.4 m2, and it operates with a hydrogen recovery level of 93.4%.

The membrane that is used for the separation units (U1) and (U2) and (U3) is a polymer membrane of the polyimide family that has a permeability of 70 Barrer and an H2 selectivity relative to the CO of 55.

The difference in pressure in the passage from the separation unit (U1), the separation unit (U2), and the separation unit (U3) is 18 bar.

Ultimately, the process produces a hydrogen flow with a purity of more than 99%, a CO content of 100 ppm, and a recovery level of 87.9%.

The entire disclosures of all applications, patents and publications, cited herein and of corresponding French application Ser. No. 07/05.317, filed Jul. 20, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A membrane process for the purification of hydrogen contained in a synthesis gas from steam reforming a petroleum fraction or natural gas comprising modifying a two stage water gas shift (WGS) process comprising a high temperature stage and a low temperature stage so as to obtain a synthesis gas containing less than 5000 ppm of CO, said modifying comprising eliminating the low temperature stage and passing the synthesis gas mixture from high-temperature WGS stage, containing more than 5,000 ppm of CO, into a system comprising three membrane separation units (U1, U2, U3), whereby said membrane process comprises the following stages:

The synthesis gas mixture to be processed (1) from the high temperature WGS stage is introduced into a first membrane separation unit (U1), from which there is extracted:

A first permeate (3) that consists essentially of hydrogen that is sent into a third membrane separation unit (U3), after recompression, A first retentate (4) that is introduced into a second membrane separation unit (U2) from which there is extracted:

A second permeate (5), which, after recompression, is recycled to the inlet of the first separation unit (U1) in a mixture with the flow to be processed (1), and A second retentate (7);

from the third membrane separation unit, there is extracted:

A third retentate (9) that is recycled to the inlet of the first membrane separation unit (U1) in a mixture with said mixture to be processed (1), A third permeate (10) that comprises hydrogen with at least 98% purity and that contains at most 150 ppm of CO.

2. A hydrogen purification process according to claim 1, in which the pressure difference between the upstream and the downstream of each membrane separation unit is between 5 and 50 bar.

3. A hydrogen purification process according to claim 1, wherein the membrane of each of the separation units is a polymeric membrane having a permeability of more than 50 Barrer and an H2 selectivity relative to the CO of more than 30.

4. A hydrogen purification process according to claim 1, wherein the membrane of each of the separation units is a polymer membrane that belongs to at least one of the following families: polyimides, polyamides, polycarbonates, polysulfones, poly(amide imides), poly(ether sulfones), polyesters.

5. A hydrogen purification process according to claim 1, wherein each separation unit conducted at an operating temperature of between 20° C. and 250° C.

6. A hydrogen purification process according to claim 1, wherein more than 85% by mass of hydrogen is recovered.

7. A hydrogen purification process according to claim 1, wherein the second retentate (7) is combusted as a fuel from said steam-reforming furnace.

8. A process according to claim 1, further comprising passing resultant hydrogen to a fuel cell.

9. A process according to claim 1, further comprising passing resultant hydrogen that is produced by the process according a unit for processing agricultural oils.

10. A process according to claim 1, wherein said process is conducted without a methanation stage.

11. A process according to claim 2, wherein the pressure difference is between 10 and 30 bar.

12. A process according to claim 1, wherein the membrane consists essentially of a polyamide.

13. A process according to claim 7, wherein said process is conducted without a methanation stage.

14. A process for the purification of hydrogen comprising the following stages:
- The mixture to be processed (1) is introduced into a first membrane separation unit (U1), from which there is extracted:
- A first permeate (3) that consists essentially of hydrogen that is sent into a third membrane separation unit (U3), after recompression,
- A first retentate (4) that is introduced into a second membrane separation unit (U2) from which there is extracted:
- A second permeate (5), which, after recompression, is recycled to the inlet of the first separation unit (U1) in a mixture with the flow to be processed (1), and
- A second retentate (7);

from the third membrane separation unit, there is extracted:
- A third retentate (9) that is recycled to the inlet of the first membrane separation unit (U1) in a mixture with said mixture to be processed (1),
- A third permeate (10) that comprises hydrogen with at least 98% purity and that contains at most 150 ppm of CO.

15. A process according to claim 14, wherein said process is conducted without a methanation stage.

* * * * *

UNITED STATES PATENT AND TRADEMARK OFFICE
CERTIFICATE OF CORRECTION

PATENT NO. : 7,947,117 B2
APPLICATION NO. : 12/176046
DATED : May 24, 2011
INVENTOR(S) : Fabrice Giroudiere et al.

It is certified that error appears in the above-identified patent and that said Letters Patent is hereby corrected as shown below:

On the Title Page Item (75) Inventors:

The city of residence for inventor Elsa JOLIMAITRE which reads "Lyons (FR)" should read --Lyon (FR)--

The city of residence for inventor Helene RODESCHINI which reads "Lyons (FR)" should read --Lyon (FR)--

Signed and Sealed this
Twenty-sixth Day of July, 2011

David J. Kappos
*Director of the United States Patent and Trademark Office*